1. KGaSiO$_4$: Mn
2. 70% KGa$_5$O$_8$: Mn
   30% KGaSiO$_4$: Mn
3. Zn$_2$SiO$_4$: Mn
4. KGa$_5$O$_8$: Mn
5. KAlGa$_4$O$_8$: Mn

1. Zn$_2$SiO$_4$: Mn
2. KGaSiO$_4$: Mn
3. KGa$_5$O$_8$: Mn
4. KAlGa$_4$O$_8$: Mn
5. 70% KGa$_5$O$_8$: Mn
   30% KGaSiO$_4$: Mn

INVENTOR
JESSE J. BROWN Jr.

April 27, 1971  J. J. BROWN, JR  3,576,757
NOVEL FLUORESCENT PHOSPHOR COMPOSITIONS
Filed June 14, 1968  2 Sheets-Sheet 2

INVENTOR
JESSE J. BROWN Jr.
BY
ATTORNEY

United States Patent Office 3,576,757
Patented Apr. 27, 1971

3,576,757
NOVEL FLUORESCENT PHOSPHOR COMPOSITIONS
Jesse J. Brown, Jr., Blacksburg, Va., assignor to Sylvania Electric Products Inc.
Filed June 14, 1968, Ser. No. 737,076
Int. Cl. C09k 1/04
U.S. Cl. 252—301.4      3 Claims

ABSTRACT OF THE DISCLOSURE

Phosphors corresponding to the formula:

$$AGa_5O_8:Mn^{2+}$$

Figure 1:
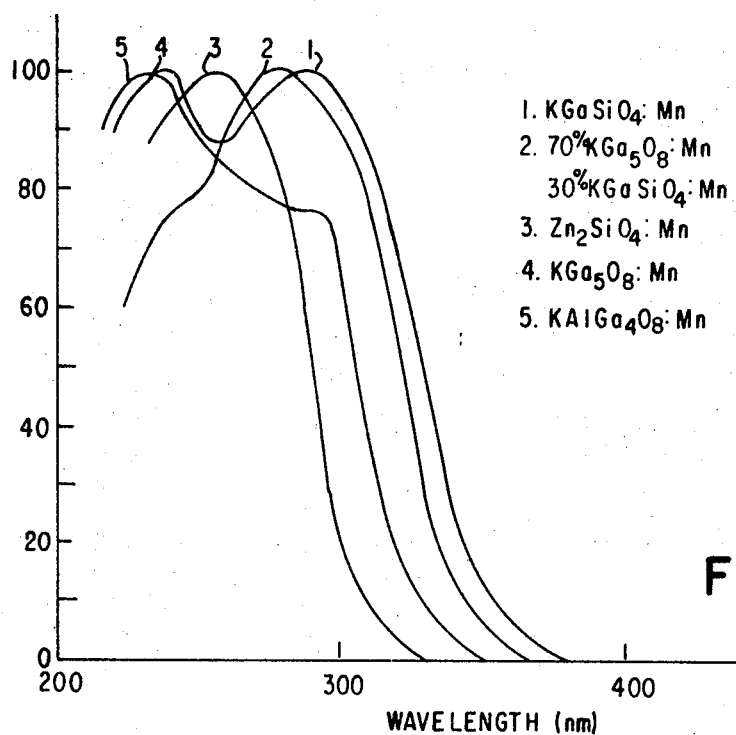

where A is potassium, sodium, and/or lithium and wherein aluminum, silicon and/or germanium may replace gallium in an amount not exceeding 70% thereof and wherein the total cation to anion ratio is about 3 to 4. The phosphors respond to ultraviolet radiation and cathode rays and are useful in mercury vapor lamps and cathode ray tubes.

BACKGROUND OF THE INVENTION

Field of the invention

This invention relates to synthetic inorganic phosphors. More precisely, the invention disclosed herein relates to manganese-activated alkali gallate compounds and closely related compounds which function as useful phosphors when exposed to a source of exciting radiation.

Description of the prior art

Phosphors are known products of commerce. Generally the term is employed in the art to describe luminescent solids which are comprised of two essential portions; a "host matrix" and an "activator." Better known host matrices include silicates, phosphates, sulfides, selenides, halides and oxides of calcium, magnesium, barium, zinc as well as others which could be mentioned. Activators most frequently employed include among others, copper, silver, thallium, lead, cerium, chromium, titanium and tin. Oftentimes, amounts of activator ranging from only a few parts per million to several percent can confer luminescent properties on the host compound. Generally, synthetic phosphors are readily prepared by reacting well mixed, finely divided compounds of the host and activator at high temperatures.

Synthetic inorganic phosphors are most generally used in fluorescent lighting. However, some find specialized applications in cathode ray tubes used in television and radar for example. It is not deemed necessary to discuss in detail manners and/or methods whereby phosphors are assembled or otherwise integrated with other components or structural elements necessary to accomplish a given function or application in which a phosphor is employed. These manners and/or methods are well known to those skilled in the art to which the present invention pertains. However, it is also well-known that development and progress in the synthetic inorganic phosphor art primarily depend upon and await the discovery of new synthetic inorganic phosphors. In this fashion, the present range of applications for phosphors can be expanded and new phosphors become available which can oftentimes be substituted for known phosphors to obtain improved performance in existing applications. Accordingly, any invention which presents new synthetic inorganic phosphors is indeed a notable and valuable contribution to the art and one well worthy of patent protection.

SUMMARY OF THE INVENTION

In accordance with the practice of the present invention, novel and useful phosphors are presented to the art. Essentially, the phosphors of the present invention conform to the following formula:

$$AGa_5O_8:Mn^{2+}$$

where A is an alkali metal cation such as potassium, sodium and lithium or mixtures thereof; Ga is gallium; and Mn is manganese preferably in the divalent state. Aluminum, silicon, and/or germanium may be substituted for gallium. However, in the above described phosphors of the present invention, the presence of gallium is necessary for efficient luminescence. In order to assure efficient luminescence, the amount of gallium should be at least about 30 mole percent per mole of Ga and the aluminum, silicon, or germanium in the host matrix or matrices of the phosphor. The manganese serves as an activator in phosphors of the present invention and may vary over a wide range. For example, activation of many of the host matrices of phosphors of the present invention can occur when the amount of about 0.0001 grams atoms of manganese per mole of anion or somewhat less are involved. However, in most instances no more than about 1.0 gram atoms of manganese are required to achieve suitable activation of the host matrices. Of course, when specialized properties are desired, larger amounts of activator can be employed but in the preferred phosphors of the present invention, the ratio of gram atoms of manganese to gram moles of phosphorus between about 0.0001 to about 0.1.

It will be apparent from the above discussion, that representative of the materials embraced within the scope of the present invention include, among others, compounds having the following matrix compositions:

$$KGa_5O_8:Mn$$

$KGa_4AlO_8:Mn$, $NaGa_4AlO_8:Mn$, $NaGa_5O_8:Mn$, $$LiGa_5O_8:Mn$$

Also included within the scope of the present invention are similar phosphors of mixed host matrices activated by manganese. Although the following is not intended in any way to be a complete listing, representative specific materials of this type include the following:

$\left.\begin{array}{l}KGa_5O_8\\KGaSiO_4\end{array}\right\}:Mn$      $\left.\begin{array}{l}NaGa_4AlO_8\\KGaSiO_4\end{array}\right\}:Mn$ $\left.\begin{array}{l}NaGa_5O_8\\LiGaSiO_4\end{array}\right\}:Mn$      $\left.\begin{array}{l}KGaGeO_4\\LiGaSiO_4\end{array}\right\}:Mn$ The respective concentration of each host matrix of phosphors having mixed host matrices can vary over a rather wide range and is primarily determined by the ultimate properties such as emission spectra and the life desired in the final phosphor.

DESCRIPTION OF THE PREFERRED EMBODIMENT

The phosphors of the present invention and properties thereof will be better understood by reference to Table I below and accompanying FIGS. 1 and 2. Table I presents a summary of ultraviolet excited peak emission wave length and peak intensity of phosphors of the present invention compared to values obtained for known manganese-activated phosphors of zinc orthosilicate, $$Zn_2SiO_4:Mn$$

and magnesium gallate, $MgGa_2O_4:Mn$.

TABLE I

| Composition | Peak emission wave-length (nm) | Relative peak height, percent |
|---|---|---|
| $ZnSiO_4$:Mn | 536 | 100 |
| $MgGa_2O_4$:Mn | 512 | 125 |
| $KGa_5O_8$:Mn | 507 | 105 |
| $KGaSiO_4$:Mn | 510 | 87 |
| 70% $KGa_5O_8$ / 30% $KGaSiO_4$ :Mn | 504 | 161 |
| $KGa_4AlO_8$:Mn | 508 | 87 |

Figure 2:
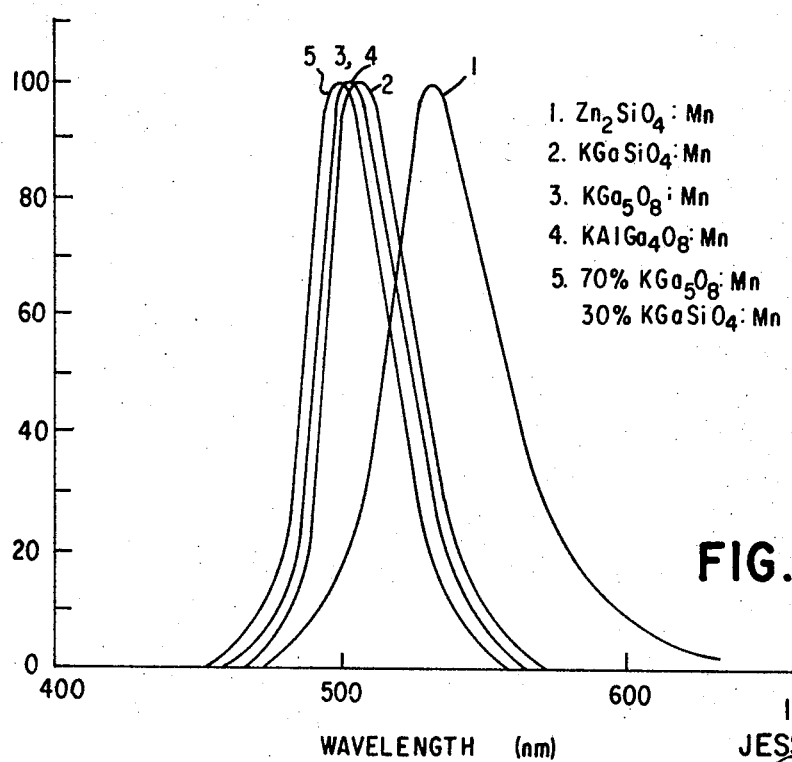

FIGS. 1 and 2 illustrate the excitation spectra and normalized emission spectra of phosphors of the present invention as compared to manganese-activated zinc orthosilicate.

From the data set forth in Table I and FIGS. 1 and 2, it is apparent that the phosphors of the present invention can be advantageously employed for a wide variety of applications. For example, they can be employed in color correction in mercury vapor discharge lamps and as a component in cathode ray tubes of the design used in colored television. One of the most outstanding utilities for phosphors of the present invention in their use in so-called aperture-type fluorescent lamps such as those used in photoduplicating devices. The phosphors of the present invention are especially suitable for this application because of their narrow band emission in that region of the spectrum where a photoduplicating device employing a selenium drum will operate with maximum image contrast and reproducing speed.

Figure 3:
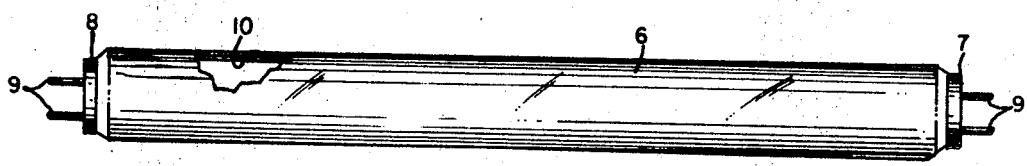
Figure 4:
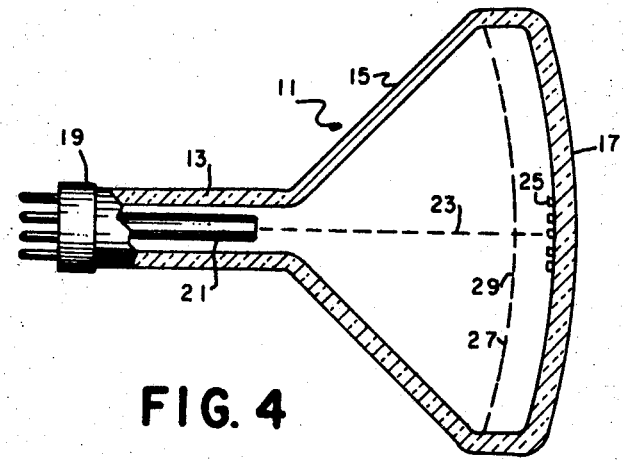

The utility of the phosphors of the present invention in fluorescent lamps and cathode ray tubes will be better understood by reference to accompanying FIGS. 3 and 4. in FIG. 3, a typical fluorescent lamp containing mercury vapor is shown including a glass envelope 6 having end caps 7 and 8 with electrical lead-in wires 9. A layer 10 of a phosphor of the present invention is coated on the internal surface of the glass envelope 6.

The phosphors of the present invention can be disposed upon the screen of a cathode ray tube such as shown in FIG. 4 and commonly in use in television receiving apparatus. The tube comprises an envelope 11, having a neck portion 13, a funnel portion 15 and a face panel 17. A tube base 19 is attached to the neck portion 13 to provide means for connecting the tube electrodes with their associated receiver circuitry. Within the neck 13 there is mounted on electron gun or guns 21 which provide the electron beam or beams 23 utilized in the operation of the tube. A color screen 25 having the usual configuration of color emitting phosphors is found on the internal surface of face panel 17. Positioned adjacent to screen 25 but substantially spaced therefrom is a mask or grid 27 having therein a plurality of apertures 29. The type of tube illustrated in FIG. 4 can use grid 27 primarily to either focus or deflect beams 23, or to mask, or to mask and focus the electron beam to attain proper electron impingement upon the screen structures and the potentials on the grid and screen will determine the type of operation in a manner well known and understood to the art.

The phosphors of the present invention can be prepared by the high temperature reaction of intimate mixtures of compounds containing the ingredients desired in the final phosphor. In general, decomposable organic or inorganic salts and oxides containing the desired ingredients can be suitably employed. The best balance of properties is usually obtained by selecting proportions of the respective compounds which are sufficient to produce a phosphor wherein the stoichiometry of cations to anion is about 3 to 4. In accordance with the present invention, a fairly bright phosphor can be obtained by heating the mixture of compounds at a temperature between about 1000° C. and about 1350° C. for from about 5 to 20 hours. The efficiency of the phosphor can be improved however by a second heat treatment in a mildly reducing atmosphere, for example, an atmosphere containing 0.01 to about 1% hydrogen in nitrogen. In general, it is best to exclude air from the phosphor until it has been cooled to room temperature. There follows a number of illustrative, non-limiting examples which teach manners for preparing specific phosphors embraced within the scope of the present invention.

EXAMPLE I

Mix the following solid ingredients:

$K_2CO_3$—11.405 gms. (0.97 mole $K_2O$)
$MnCO_3$—0.229 gms. (0.02 mole MnO)
$Ga_2O_3$—93.720 gms. (5.0 moles $G_2O_3$)

Heat the mixture in air in open fused silica crucibles at 1100° C. for about 17 hours. Pulverize the reacted product and reheat at 1200° C. for about 1 hour in an $N_2$-0.01% $H_2$ atmosphere. Cool the heated product in an atmosphere substantially free of molecular oxygen. The phosphor produced in accordance with the above method has a host matrix of $KGa_5O_8$ with 0.01 mole of potassium replaced by manganese activator. This phosphor is identified as phosphors 4 and 3 on FIGS. 1 and 2 respectively.

EXAMPLE II

Mix the following solid ingredients:

$K_2CO_3$—11.405 gms. (0.97 mole $K_2O$)
$Ga_2O_3$—18.444 gms. (1 mole $Ga_2O_3$)
Silicic acid—13.333 gms. (2 moles $SiO_2$)
$MnCO_3$—0.229 gm. (0.02 mole MnO)

By following the procedure set forth in Example I, a phosphor is produced having a host matrix of $KGaSiO_4$ with 0.01 mole of potassium replaced by manganese activator. This phosphor is identified as phosphor 2 on FIGS. 1 and 2 respectively.

EXAMPLE III

Mix the following solid ingredients:

$K_2CO_3$—11.405 gms. (0.97 mole $K_2O$)
$Ga_2O_3$—121.862 gms. (6 moles $Ga_2O_3$)
Silicic acid—39.999 gms. (2 moles $SiO_2$)
$MnCO_3$—0.229 gm. (0.02 mole MnO)

By following the procedure set forth in Example I above, a phosphor is produced having a host matrix of 70% mole percent $KGa_5O_8$ and 30 mole percent $KGaSiO_4$ with 0.01 mole of potassium replaced by manganese. This phosphor is identified as phosphors 2 and 5 on FIGS. 1 and 2 respectively.

EXAMPLE IV

Mix the following ingredients:

$K_2CO_3$—11.405 gms. (0.97 mole $K_2O$)
$Ca_2O_3$—74.976 gms. (4.00 moles $Ga_2O_3$)
$Al_2O_3$(in $H_2O$)—15.596 gms. (1.00 mole $Al_2O_3$)
$MnCO_3$—0.229 gm. (0.02 mole MnO)

By following the procedure set forth in Example I, a phosphor is produced having a host matrix of $KGa_4AlO_8$ with 0.01 mole of potassium replaced by manganese. This phosphor is identified as phosphors 5 and 4 in FIGS. 1 and 2 respectively.

Many modifications of incidental details offered in the above examples for the purpose of illustrating the invention can be employed without departing from the spirit and scope of the invention defined in the appended claims.

Having described the invention in detail together with preferred embodiments thereof as well as manners of practicing the same, what is declared as new and desired to be secured by U.S. Letters Patent is as follows:

1. A phosphor corresponding to the following formula:

$$AGa_5O_8:Mn^{2+}$$

where A is potassium, sodium, and/or lithium.

2. The phosphor of claim 1 wherein the ratio of gram atoms of manganese to gram moles of phosphor is between 0.0001 and 0.1.

3. The phosphor of claim 1 wherein aluminum, silicon and/or germanium is substituted for the gallium in an amount not exceeding 70% thereof, and where the total cation to anion ratio is about 3 to 4.

References Cited
UNITED STATES PATENTS

| | | | |
|---|---|---|---|
| 3,407,139 | 10/1968 | Brown, Jr. | 252—301.4 |
| 3,407,325 | 10/1968 | Brown, Jr. | 252—301.4 |

ROBERT D. EDMONDS, Primary Examiner

U.S. Cl. X.R.

252—301.4